United States Patent
Toyama et al.

(10) Patent No.: US 10,363,523 B2
(45) Date of Patent: Jul. 30, 2019

(54) EXHAUST GAS PURIFYING APPARATUS

(71) Applicant: FUJI ELECTRIC CO., LTD., Kawasaki-shi (JP)

(72) Inventors: Hiroyuki Toyama, Hino (JP); Eiju Nakada, Yokohama (JP); Takashi Inui, Hachioji (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 907 days.

(21) Appl. No.: 14/591,462

(22) Filed: Jan. 7, 2015

(65) Prior Publication Data

US 2015/0147233 A1 May 28, 2015

Related U.S. Application Data

(63) Continuation of application No. PCT/JP2013/083867, filed on Dec. 18, 2013.

(30) Foreign Application Priority Data

Dec. 19, 2012 (JP) .................................. 2012-276820

(51) Int. Cl.
  *B01D 47/00* (2006.01)
  *B01D 53/14* (2006.01)
  (Continued)

(52) U.S. Cl.
  CPC .......... *B01D 53/78* (2013.01); *B01D 53/346* (2013.01); *B01D 53/502* (2013.01);
  (Continued)

(58) Field of Classification Search
  None
  See application file for complete search history.

(56) References Cited

U.S. PATENT DOCUMENTS 4,172,773 A * 10/1979 Pellegri ............... C02F 1/46109
  205/743
4,863,644 A * 9/1989 Harrington ......... B01F 3/04106
  261/123

(Continued)

FOREIGN PATENT DOCUMENTS

CN   1382515 A   12/2002
DE   102010050692 B3   3/2012

(Continued)

OTHER PUBLICATIONS

Translation of JP2003290770A, accessed Jan. 18, 2018.*

(Continued)

*Primary Examiner* — Amber R Orlando
*Assistant Examiner* — Phillip Y Shao
(74) *Attorney, Agent, or Firm* — Rabin & Berdo, P.C.

(57) ABSTRACT

Provided is an exhaust gas purifying apparatus capable of purifying exhaust gas by using water. The exhaust gas purifying apparatus includes an electrolyzed alkaline water generator which includes a cathode and an anode formed of Mg or an Mg alloy, and in which water is electrolyzed through application of voltage across the cathode and anode, to generate electrolyzed alkaline water. The purifying apparatus includes an exhaust gas absorption tower into which exhaust gas is introduced. Spray nozzles spray the electrolyzed alkaline water in the exhaust gas absorption tower.

12 Claims, 9 Drawing Sheets

(51) Int. Cl.
- B01D 53/78 (2006.01)
- B01D 53/60 (2006.01)
- B01D 53/50 (2006.01)
- B01D 53/56 (2006.01)
- B01D 53/34 (2006.01)
- B01D 53/92 (2006.01)
- C02F 1/461 (2006.01)

(52) U.S. Cl.
CPC ........... B01D 53/504 (2013.01); B01D 53/56 (2013.01); B01D 53/60 (2013.01); B01D 53/92 (2013.01); *B01D 2251/402* (2013.01); *B01D 2252/1035* (2013.01); *B01D 2257/302* (2013.01); *B01D 2257/404* (2013.01); *B01D 2258/012* (2013.01); *B01D 2259/4566* (2013.01); *C02F 1/4618* (2013.01); *C02F 1/46109* (2013.01); *C02F 2001/4619* (2013.01); *C02F 2001/46133* (2013.01); *C02F 2001/46152* (2013.01)

(56) References Cited

U.S. PATENT DOCUMENTS

| | | |
|---|---|---|
| 5,427,871 A | 6/1995 | Garshol et al. |
| 5,980,703 A | 11/1999 | Yamada et al. |
| 9,216,376 B2 | 12/2015 | Liu et al. |
| 2003/0012706 A1 | 1/2003 | Onizuka et al. |
| 2011/0036728 A1 | 2/2011 | Farsad |
| 2012/0121489 A1 | 5/2012 | Chew |
| 2013/0180400 A1 | 7/2013 | Iwamoto et al. |
| 2013/0228457 A1 | 9/2013 | Bilbao et al. |

FOREIGN PATENT DOCUMENTS

| | | |
|---|---|---|
| EP | 0647594 A2 | 4/1995 |
| JP | 2003-284919 A | 1/1996 |
| JP | H08-10564 A | 1/1996 |
| JP | 10-286571 A | 10/1998 |
| JP | 11-100688 A | 4/1999 |
| JP | 2000-271429 A | 10/2000 |
| JP | 2002-210326 A | 7/2002 |
| JP | 2003-290770 A | 10/2003 |
| JP | 2003-301714 A | 10/2003 |
| JP | 2003290770 A * | 10/2003 |
| JP | 2003301714 A * | 10/2003 |
| JP | 2006-320870 A | 11/2006 |
| JP | 2006-320870 A | 11/2006 |
| JP | 2009-136813 A | 6/2009 |
| JP | 2012-179521 A | 9/2012 |
| JP | 2012-528706 A | 11/2012 |
| WO | WO 92-014272 A1 | 8/1992 |
| WO | WO-2008/105212 A1 | 9/2008 |
| WO | WO 2010-074687 A1 | 7/2010 |
| WO | WO-2012/029757 A1 | 3/2012 |
| WO | 2012059465 A1 | 5/2012 |
| WO | WO 2012-085552 A1 | 6/2012 |
| WO | WO 2012-128721 A2 | 9/2012 |

OTHER PUBLICATIONS

Translation of JP2003301714A, accessed Jan. 18, 2018.*
Chinese Office Action dated Nov. 11, 2015, and its partial translation.
Sukheon An et al., "New Application of Seawater and Electrolyzed Seawater in Air Pollution Control of Marine Diesel Engine", JSME International Journal, Series B, vol. 46, No. 1, Jan. 1, 2003.
Osami Nishida, et al., "Development of De-Mist and De-Sulfurization System by Seawater Electrolysis", The Japan Society of Mechanical Engineers, 2001(76), "14-9" "14-10", Mar. 16, 2001, English abstract.
Japanese Office Action with translation dated Nov. 17, 2015.
Japanese Office Action with partial translation dated Jul. 14, 2015.

* cited by examiner

EXHAUST GAS PURIFYING APPARATUS

The present application is a continuation of and claims the benefit of the priority of Applicant's earlier filed International Application No. PCT/JP2013/083867 filed Dec. 18, 2013, the entire contents of which are incorporated herein by reference, which claims priority to Japanese patent No. 2012-276820, filed on Dec. 19, 2012, which is herein incorporated by reference.

TECHNICAL FIELD

The present invention relates to an exhaust gas purifying apparatus that purifies exhaust gas containing $NO_X$, $SO_X$ and the like and discharged from an internal combustion engine such as a diesel engine, or a combustion engine such as a boiler. More particularly, the present invention relates to an exhaust gas purifying apparatus that is suitable for installation in vessels and the like.

BACKGROUND ART

Internal combustion engines such as diesel engines and combustion engines such as boilers utilize fossil fuels. Combustion of fossil fuels is accompanied by generation of exhaust gas that contains $NO_X$, $SO_X$, oil, microparticles and the like, and which constitutes a source of environmental pollution. Accordingly, approaches adopted to reduce those sources of environmental pollution in exhaust gas include, for instance, improving fuels, enhancing combustion efficiency, and introducing exhaust gas treating equipment.

Improvements have been achieved in vehicles and overland facilities such as factories and thermal power plants.

However, engine emissions in marine or river vessels are far greater than those of automobiles or the like, while such vessels have virtually no surplus space amenable for installation of exhaust gas treating equipment. Moreover, adopting technologies and equipment that are geared toward overland uses into in vessels has proved difficult thus far from an economic standpoint.

For example, ammonia SCR (Selective Catalytic Reduction) is one instance of technologies for treating $NO_X$ in exhaust gas. Ammonia SCR is a method, implemented on land, that involves causing $NO_X$ in exhaust gas to react with ammonia, to trigger decomposition into water and nitrogen. However, ammonia SCR requires securing large amounts of ammonia, and has therefore proved difficult to utilize in vessels.

For instance, magnesium hydroxide methods and lime-gypsum methods in which scrubbers are utilized are implemented overland to deal with $SO_X$. Techniques developed to adapt the foregoing methods to vessels include treatment methods that involve introducing seawater into a scrubber, to cause $SO_X$ in exhaust gas to be absorbed by seawater, and oxidizing thereafter $SO_X$ into sulfate ions by aeration.

Patent literature 1 discloses the feature of performing pulsed corona discharge on exhaust gas of a marine diesel engine, followed by introduction of the exhaust gas into a scrubber, and spraying of the exhaust gas with seawater to remove thereby nitrogen oxide and sulfur oxide from the exhaust gas.

Patent literature 2 discloses the feature of subjecting exhaust gas to a purification treatment by electrolyzing salt water to generate an alkaline solution and an acidic solution, and bringing the exhaust gas to be treated into gas-liquid contact with the acidic solution, and thereafter into gas-liquid contact with the alkaline solution.

Patent literature 1: Japanese Patent Application Publication No. H08-10564
Patent literature 2: Japanese Patent Application Publication No. 2003-284919

However, the effect of reducing the amount of $SO_X$ and the like in the methods disclosed in Patent literature 1 and 2 is not found to be sufficient. Further, these methods required a large amount of seawater during the purification treatment of exhaust gas. This gave rise to the problem of large power consumption, incurred by pump operation, during uptake of seawater to be used in the purification treatment, and during discharge of scrubber wastewater back into the ocean. No external power supply can be received at sea, and hence power consumption must be met by relying on power generated within the vessel. The power consumption of such pumps should thus be desirably reduced as much as possible.

Further, scrubber wastewater contains $NO_X$, $SO_X$, oil, microparticles and the like that are present in exhaust gas, and hence discharge of scrubber wastewater without having undergone any treatment will tend to be ever harder on account of water quality regulations by the International Maritime Organization.

DISCLOSURE OF THE INVENTION

Accordingly, it is an object of the present invention to provide an exhaust gas purifying apparatus capable of purifying exhaust gas efficiently using small amounts of water.

In order to attain the above goal, the exhaust gas purifying apparatus of the present invention is an exhaust gas purifying apparatus comprising: an electrolyzed alkaline water generator which includes a cathode and an anode, and in which water to be electrolyzed is electrolyzed through application of voltage across the electrodes, to generate electrolyzed alkaline water; an exhaust gas absorption tower into which exhaust gas is introduced; an electrolyzed alkaline water supply line through which the electrolyzed alkaline water generated in the electrolyzed alkaline water generator is introduced into the exhaust gas absorption tower; and a spray nozzle of the electrolyzed alkaline water, provided inside the exhaust gas absorption tower, the exhaust gas purifying apparatus being configured to purify the exhaust gas by spraying the electrolyzed alkaline water through the spray nozzle, such that the electrolyzed alkaline water and the exhaust gas introduced into the exhaust gas absorption tower are brought into gas-liquid contact with each other, wherein the electrolyzed alkaline water generator includes the anode formed of Mg or a Mg alloy.

Preferably, the exhaust gas purifying apparatus of the present invention comprises a scrubber wastewater storage section that recovers the electrolyzed alkaline water sprayed from the spray nozzle, and a scrubber wastewater return line through which scrubber wastewater from inside the scrubber wastewater storage section is returned to the electrolyzed alkaline water generator. Preferably, an air diffuser device is further provided in the scrubber wastewater storage section.

Preferably, the exhaust gas purifying apparatus of the present invention comprises a water quality analyzer that analyzes alkalinity of the electrolyzed alkaline water generated in the electrolyzed alkaline water generator, and an alkalinity adjustment device that adjusts the alkalinity of the electrolyzed alkaline water in such a manner that the alkalinity becomes equal to or higher than a predetermined value.

Preferably, the electrolyzed alkaline water generator of the exhaust gas purifying apparatus of the present invention comprises an electrolysis tank made up of a water-insoluble and conductive material, and an anode disposed inside the electrolysis tank, the exhaust gas purifying apparatus being configured to apply positive voltage to the anode and apply negative voltage to the electrolysis tank, to thereby electrolyze the water to be electrolyzed inside the electrolysis tank, or alternatively, the electrolyzed alkaline water generator includes a pathway, that may also be referred to as a duct, which is made up of a water-insoluble and conductive material and through which the water to be electrolyzed flows, and an anode disposed inside the pathway, the exhaust gas purifying apparatus being configured to apply positive voltage to the anode and apply negative voltage to the pathway, to thereby electrolyze the water to be electrolyzed that flows through the pathway.

The exhaust gas purifying apparatus of the present invention comprises an electrolyzed alkaline water generator which includes a cathode and an anode, and in which water to be electrolyzed is electrolyzed through application of voltage across the electrodes by first voltage application means, to generate electrolyzed alkaline water; an exhaust gas absorption tower into which exhaust gas is introduced; an electrolyzed alkaline water supply line through which the electrolyzed alkaline water generated in the electrolyzed alkaline water generator is introduced into the exhaust gas absorption tower; and a spray nozzle of the electrolyzed alkaline water, provided inside the exhaust gas absorption tower, the exhaust gas purifying apparatus being configured to purify the exhaust gas by spraying the electrolyzed alkaline water through the spray nozzle, such that the electrolyzed alkaline water and the exhaust gas introduced into the exhaust gas absorption tower are brought into gas-liquid contact with each other and the exhaust gas is purified, wherein the electrolyzed alkaline water generator includes, in addition to the cathode, and the anode formed of Mg or a Mg alloy, an auxiliary anode made up of a water-insoluble and conductive material, such that the auxiliary anode is connected to the cathode and the anode by way of a coupling circuit, and second voltage application means applies voltage to the auxiliary anode.

In the electrolyzed alkaline water generator of the exhaust gas purifying apparatus of the present invention, preferably, a diode is used in the coupling circuit.

In the electrolyzed alkaline water generator of the exhaust gas purifying apparatus of the present invention, preferably, a transistor is used in the coupling circuit.

Preferably, the electrolyzed alkaline water generator of the exhaust gas purifying apparatus of the present invention has a plurality of connected anodes and cathodes, the coupling circuit includes coupled elements in the number corresponding to the number of combinations of the anodes and the cathodes, and the auxiliary anode is connected to each of the coupled elements.

In the exhaust gas purifying apparatus of the present invention, the anode of an electrolyzed alkaline water generator is formed of Mg or a Mg alloy. Therefore, Mg ions elute from the anode, and $Mg(OH)_2$ is generated, through electrolysis of water to be electrolyzed in the electrolyzed alkaline water generator. The $Mg(OH)_2$ concentration increases in proportion to the increase in the quantity of electricity during electrolysis. The alkalinity of the electrolyzed alkaline water can therefore be increased efficiently. This increased alkalinity of the electrolyzed alkaline water allows efficiently removing $SO_X$ and the like in the exhaust gas when the electrolyzed alkaline water is brought into gas-liquid contact with the exhaust gas.

Accordingly, the present invention allows exhaust gas to be subjected to a purification treatment by using electrolyzed alkaline water of high alkalinity. It becomes therefore possible to purify efficiently exhaust gas using a small amount of electrolyzed alkaline water, to reduce power consumption incurred by pump operation, and to reduce the discharge amount of scrubber wastewater.

BRIEF DESCRIPTION OF THE DRAWINGS

FIGS. 4A and 4B are schematic diagrams of another embodiment of an electrolyzed alkaline water generator, where FIG. 4A is a front-view diagram and FIG. 4B is an A-A cross-sectional diagram of FIG. 4A;

BEST MODE FOR CARRYING OUT THE INVENTION

An embodiment of the exhaust gas purifying apparatus of the present invention will be explained next with reference to FIG. 1.

Figure 1:
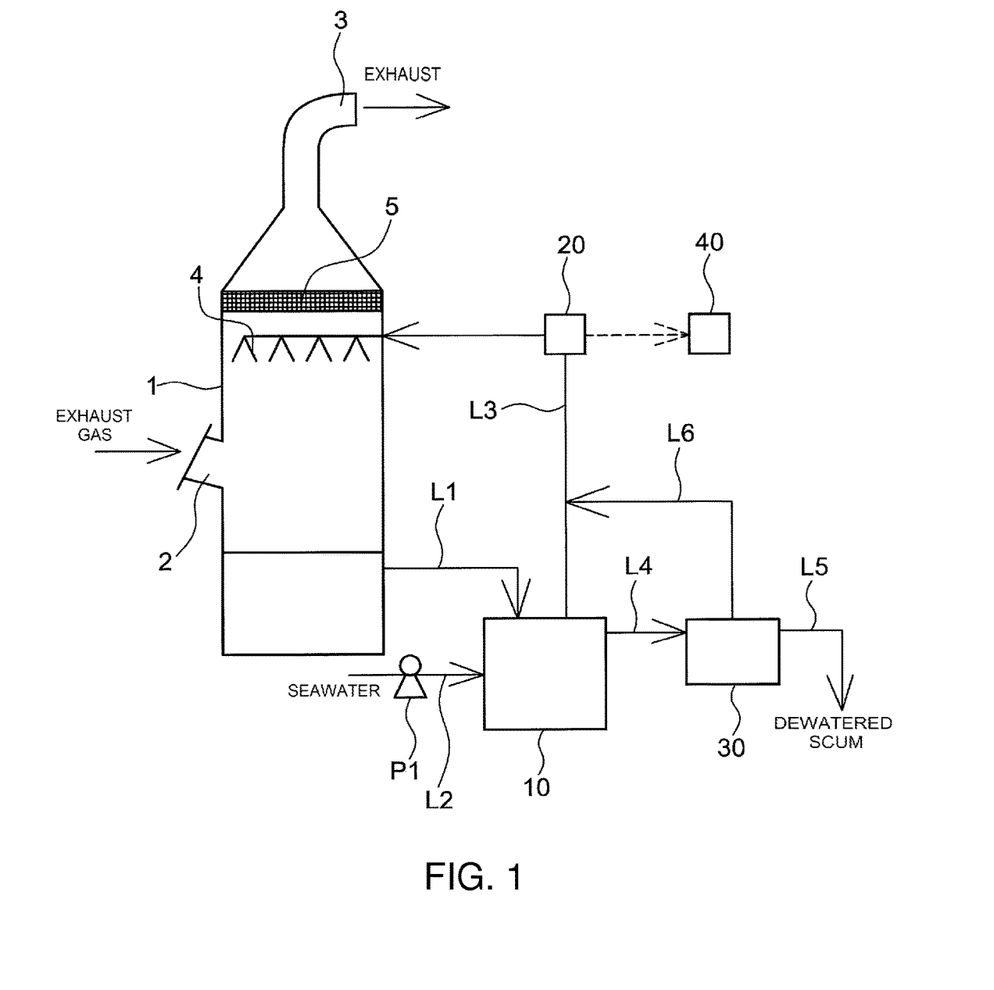
FIG. 1 is a schematic diagram of an exhaust gas purifying apparatus in a first embodiment of the present invention.

In FIG. 1, the reference symbol 1 denotes an exhaust gas absorption tower having an exhaust gas inlet 2 provided in a side wall and a flue 3 provided at the top.

Spray nozzles 4 and a demister 5 are disposed inside the exhaust gas absorption tower 1. The demister 5 is disposed in the vicinity of the flue 3.

The demister 5, which removes moisture in gas, is for instance made up of wire mesh of stainless steel, aluminum or the like.

The bottom of the exhaust gas absorption tower 1 constitutes a scrubber wastewater storage section 70 of scrubber wastewater having captured therein pollutants such as $NO_X$, $SO_X$, oil, microparticles and the like that are contained in exhaust gas.

A pipe L1 that extends from the bottom side wall of the exhaust gas absorption tower 1, or from the scrubber wastewater storage section 70, and is connected to an electrolyzed alkaline water generator 10. In this embodiment, the pipe L1 constitutes a scrubber wastewater return line of the present invention.

In the electrolyzed alkaline water generator 10, which includes a cathode and an anode, voltage is applied across the electrodes, to bring about electrolysis of water to be electrolyzed, and generate thereby electrolyzed alkaline water. At least the anode of the electrolyzed alkaline water generator 10 is formed of Mg or a Mg alloy. The cathode is not particularly limited, and for instance a cathode can be used that is conductive, for instance Mg, a Mg alloy, stainless steel, Ti, a Ti alloy, Pt, a Pt alloy, a carbon-based conductive material, a conductive ceramic or the like.

Figure 2:
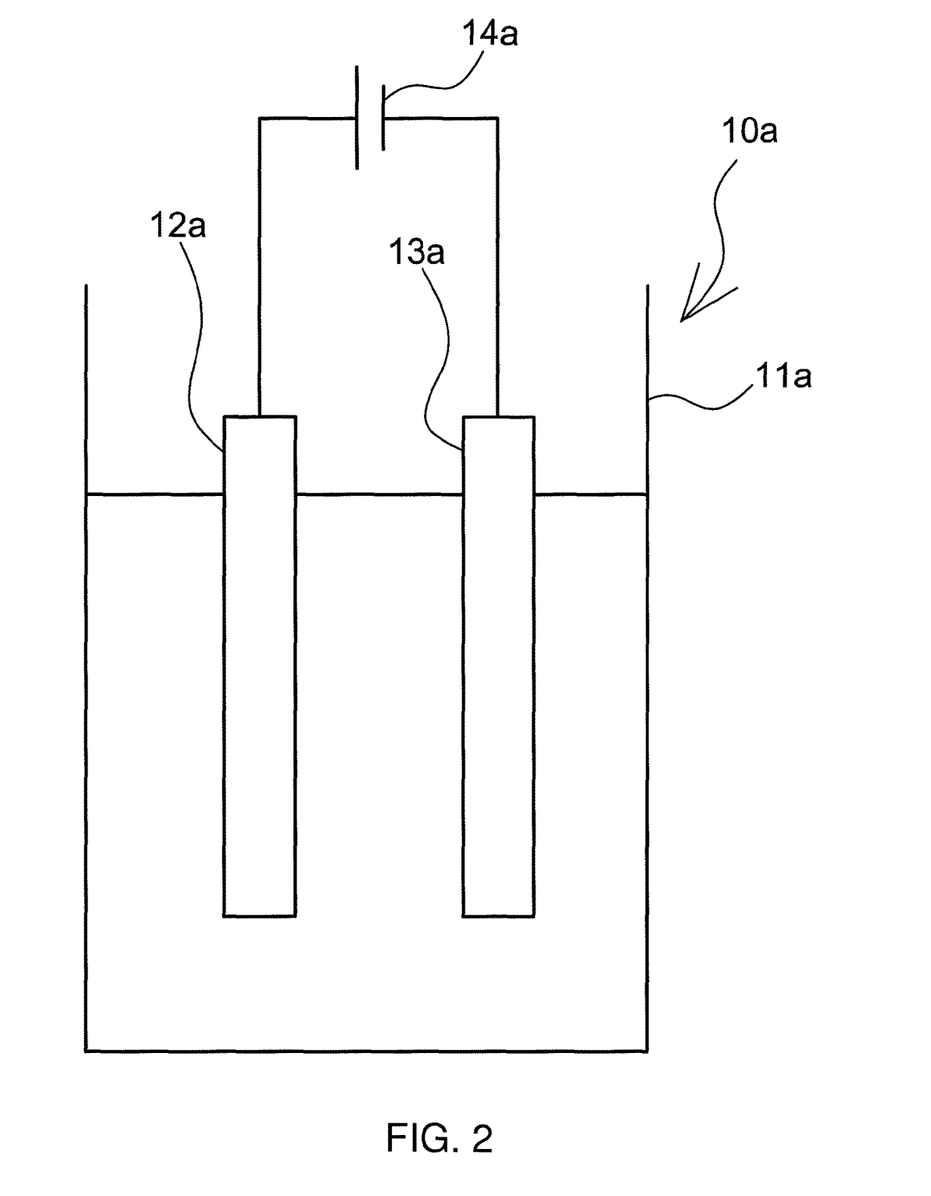
FIG. 2 is a schematic diagram of one embodiment of an electrolyzed alkaline water generator.

For instance, an electrolyzed alkaline water generator 10a illustrated in FIG. 2 constitutes herein an example of the electrolyzed alkaline water generator. The electrolyzed alkaline water generator 10a includes an electrolysis tank 11a into which water to be electrolyzed is introduced, an anode 12a formed of Mg or a Mg alloy, and a cathode 13a that opposes the anode 12a. The water to be electrolyzed that is introduced into the electrolysis tank 11a is electrolyzed through application of voltage, across the electrodes, by a power source 14a.

Figure 3:
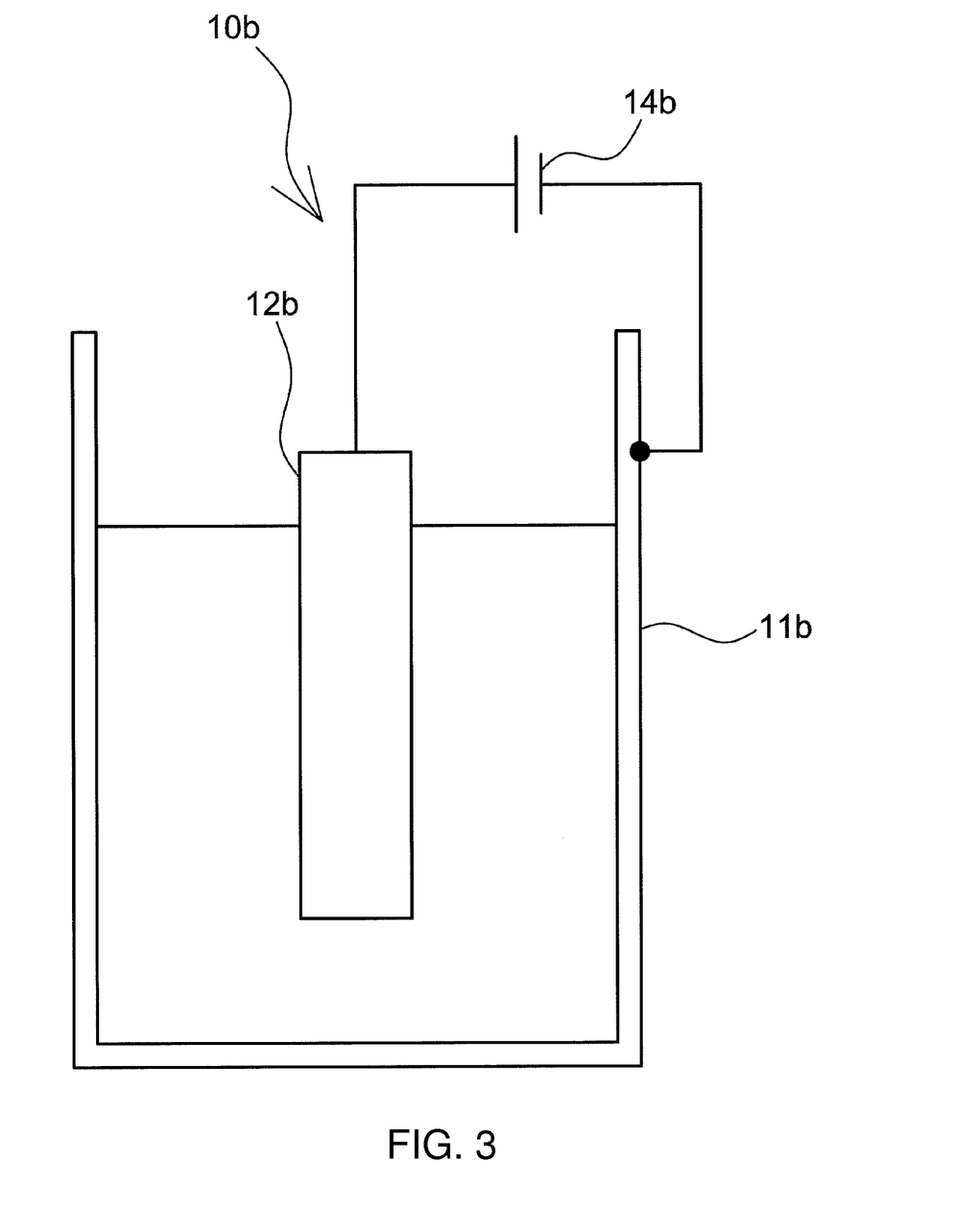
FIG. 3 is a schematic diagram of another embodiment of an electrolyzed alkaline water generator.

An electrolyzed alkaline water generator 10b illustrated in FIG. 3 exemplifies another form of the electrolyzed alkaline water generator. The electrolyzed alkaline water generator 10b includes an electrolysis tank 11b made up of a water-insoluble and conductive material, and an anode 12b that is formed of Mg or a Mg alloy. The anode 12b is disposed, inside the electrolysis tank 11b, at a predetermined spacing from sidewalls of the electrolysis tank 11b. The electrolysis tank 11b of the electrolyzed alkaline water generator 10b functions as a cathode. Water to be electrolyzed inside the electrolysis tank is electrolyzed through application, by a power source 14b, of positive voltage to the anode 12b and negative voltage to the electrolysis tank 11b.

Examples of the water-insoluble conductive material that makes up the electrolysis tank 11b include, for instance, stainless steel, Ti, Ti alloys, Pt, Pt alloys, carbon-based conductive materials and conductive ceramics. Preferably, the material does not dissolve in water during electrolysis and does not form a passive film.

Preferably, the outer periphery of the electrolysis tank 11b is covered with an insulating layer. The concern of electric shock can be dispelled by covering the outer periphery of the electrolysis tank 11b with an insulating layer. The electrolysis tank 11b may exhibit a structure wherein a metal layer formed of a water-insoluble and conductive material is formed on the inner wall of a tank that is made up of an insulating material.

Figure 4A:
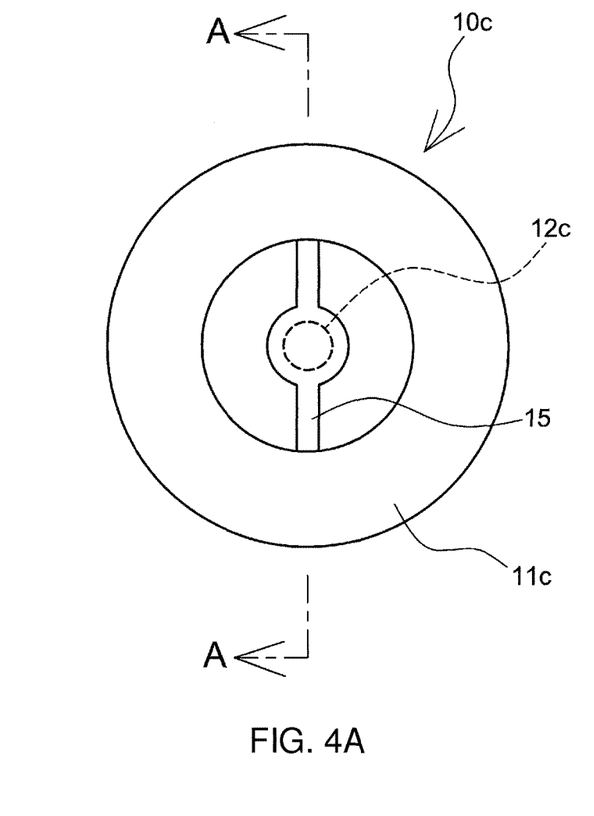
Figure 4B:
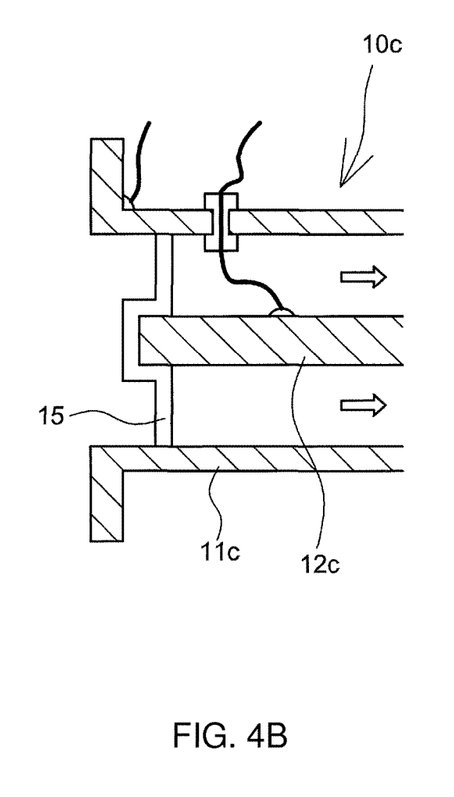

An electrolyzed alkaline water generator 10c illustrated in FIGS. 4A and 4B exemplifies another form of the electrolyzed alkaline water generator.

The electrolyzed alkaline water generator 10c includes a pipe 11c through which water to be electrolyzed flows and that is made up of a water-insoluble and conductive material, and an anode 12c that is disposed inside the pipe 11c. The anode 12c is disposed inside the pipe 11c at a predetermined spacing from the latter, via an insulating spacer 15. The pipe 11c of the electrolyzed alkaline water generator 10c functions as a cathode. Water to be electrolyzed that flows through the interior of the pipe is electrolyzed through application, by a power source 14c, of positive voltage to the anode 12c and of negative voltage to the pipe 11c.

Preferably, the outer periphery of the pipe 11c is covered with an insulating layer. The concern of electric shock can be dispelled by covering the outer periphery of the pipe 11c with an insulating layer. The pipe 11c may exhibit a structure wherein the inner wall of a pipe made of an insulating material has thereon a metal layer formed of a water-insoluble and conductive material.

Returning to FIG. 1, a pipe L2 is connected to the electrolyzed alkaline water generator 10 via an interposed pump P1. Through operation of the pump P1, seawater from a seawater source such as the ocean is introduced into the electrolyzed alkaline water generator 10, via the pipe L2.

A pipe L3 for drawing of electrolyzed alkaline water and a pipe L4 for drawing of scum extend from the electrolyzed alkaline water generator 10.

The pipe L3 for drawing of electrolyzed alkaline water is connected to the spray nozzles 4 inside the exhaust gas absorption tower 1. A water quality analyzer 20 is disposed halfway in the pipe L3. The water quality analyzer 20 analyzes various water quality items of the electrolyzed alkaline water such as pH, conductivity, alkalinity, quantity of solid matter, quantity of bacteria, quantity of organic matter, $NO_X$, $SO_X$ and the like. The analysis results are fed back to a control device 40, which controls for instance the operating condition of the pump P1 and the application condition (quantity of electricity) in the electrolyzed alkaline water generator 10 in such a manner that the various water quality items satisfy the given criteria of treatment water for a purification treatment of exhaust gas.

The pipe L4 for drawing scum is connected to a dewatering device 30, where dewatered scum is formed through dewatering of the scum. The dewatering device 30 is not particularly limited, and commercially available dewatering devices that rely on a scheme that is not limited can be used herein, for instance a belt press, a screw press or the like.

A pipe L5 for drawing dewatered scum and a pipe L6 for liquid drawing are connected to the dewatering device 30. The pipe L6 for liquid drawing is connected to the pipe L3 for drawing electrolyzed alkaline water. The liquid recovered in the dewatering device 30 is mixed with the electrolyzed alkaline water that flows through the pipe L3, and the resulting mixture is introduced into the exhaust gas absorption tower 1.

In the exhaust gas purifying apparatus, the electrolyzed alkaline water generated in the electrolyzed alkaline water generator 10 is sprayed out of the spray nozzles 4; thereby, the exhaust gas introduced into the exhaust gas absorption tower 1 through the exhaust gas inlet 2 and the electrolyzed alkaline water are brought into gas-liquid contact with each other. Pollutants such as $NO_X$, $SO_X$, oil, microparticles and the like in the exhaust gas are trapped as a result in the electrolyzed alkaline water, and fall to the bottom of the exhaust gas absorption tower 1 together with the scrubber wastewater. The moisture in the gas having had pollutants removed therefrom is in turn removed in the demister 5. The gas is discharged then out of the system through the flue 3.

Among the pollutants in the exhaust gas, for instance $SO_2$ is captured in the electrolyzed alkaline water, as the reaction in Formula (1) below progresses. The reaction in Formula (2) proceeds rapidly in the electrolyzed alkaline water thanks to the oxygen in the exhaust gas.

$$H_2O + SO_2 \rightarrow HSO_3^- + H^+ \qquad (1)$$

$$HSO_3^- + 1/2 O_2 \rightarrow SO_4^{2-} + H^+ \qquad (2)$$

$$H^+ + OH^- \rightarrow H_2O \qquad (3)$$

Further, NO is captured in the electrolyzed alkaline water as Formulas (4) and (5) below progress. Chlorine gas is generated at the anode during electrolysis.

$$2NO + Cl_2 \rightarrow 2NOCl \qquad (4)$$

$$NOCl + 2OH^- \rightarrow Cl^- + NO_2^- + H_2O \qquad (5)$$

As denoted by Formulas (1) to (3), $H^+$ is generated in a reaction between the electrolyzed alkaline water and $SO_2$. The reaction of Formula (1) takes place no longer when the pH of the electrolyzed alkaline water drops. Therefore, alkaline water is required in order to neutralize the $H^+$ that is generated in the reaction of Formula (1). Also, the reaction of Formula (5) takes place no longer when OH⁻ becomes insufficient in the reaction between the electrolyzed alkaline water and NO. Therefore, alkaline water is required in order to replenish the OH⁻ that is consumed in the reaction of Formula (5). The present invention allows increasing the alkalinity of the electrolyzed alkaline water, and hence it becomes possible to curtail drops in pH of the electrolyzed alkaline water, and to facilitate the reaction of Formula (1) and the reaction of Formula (5), even when using a small amount of the electrolyzed alkaline water. As a result, it is no longer necessary to use large amounts of electrolyzed alkaline water.

For instance, in electrolysis of seawater, the pH must be set to about 10 to 11 even upon increased quantity of electricity (current×time). In the exhaust gas purifying apparatus of the present invention, however, the anode of the electrolyzed alkaline water generator 10 is formed of Mg or a Mg alloy, and hence Mg ions are eluted from the anode during electrolysis, and $Mg(OH)_2$ is generated. The concentration of $Mg(OH)_2$ increases proportionally to the increase in quantity of electricity during electrolysis, while $Mg(OH)_2$ does not precipitate up to about pH 12. The alkalinity of the electrolyzed alkaline water can therefore be increased efficiently.

Accordingly, the exhaust gas purifying apparatus of the present invention allows purifying exhaust gas in electrolyzed alkaline water of high $Mg(OH)_2$ concentration. Hence, exhaust gas can be purified with good efficiency, using small amounts of electrolyzed alkaline water, and there can be reduced both the amount of electrolyzed alkaline water that is used in the purification treatment and the amount of discharged scrubber wastewater.

In the present embodiment, the scrubber wastewater is drawn by the pipe L1, is introduced into the electrolyzed alkaline water generator and is electrolyzed, whereupon electrolyzed alkaline water is generated as a result. Accordingly, this allows re-using scrubber wastewater in the form of washing water for an exhaust gas purification treatment, and to significantly reduce the treatment amount of wastewater.

Bacteria derived from seawater are present in the scrubber wastewater. The temperature of the scrubber wastewater is often 40° C. or lower, and hence a concern arises in that proliferation of bacteria may be activated if soluble organic matter is present in the scrubber wastewater. However, the organic matter can be decomposed, and bacteria sterilized, through the action of OH radicals and hypochlorous acid that are generated during electrolysis.

The scrubber wastewater contains oils, microparticles and the like captured from the exhaust gas, but this captured matter is flocculated through reaction with Mg ions and/or OH ions generated during electrolysis, and can therefore be recovered in the form of solid matter (scum). The scum discharged out of the electrolyzed alkaline water generator 10 is fed, via the pipe L4, to the dewatering device 30, were it undergoes solid-liquid separation. The recovered dewatered scum, in the form of solid matter, is stored as waste that is disposed of when the vessel calls at a port. The separated liquid recovered in liquid form is mixed with the electrolyzed alkaline water that is generated in the electrolyzed alkaline water generator 10, and the resulting mixture is used in the purification treatment of exhaust gas.

In the present embodiment, the water quality analyzer 20 measures various water quality items, for instance pH, conductivity, alkalinity, quantity of solid matter, quantity of bacteria, quantity of organic matter, $NO_X$, $SO_X$ and the like of the scrubber wastewater that is generated, by electrolysis, in the electrolyzed alkaline water generator 10. The measurement results are inputted to the control device 40, which performs feedback control of the operating condition of the pump P1 and the application condition (quantity of electricity) of the electrolyzed alkaline water generator 10 in such a manner that the measurement results satisfy given criteria of treatment water for exhaust gas purification treatment. Therefore, it becomes possible to curtail variability in the quality of the electrolyzed alkaline water that is introduced into the exhaust gas absorption tower 1.

Methods resorted to in a case where, for instance, the alkalinity or the pH fails to meet a standard include methods that involve performing an operation of increasing the quantity of electricity at the time of electrolysis, or driving the pump P1 to inject seawater into the electrolyzed alkaline water generator 10 and replenish thereby alkaline components contained in the seawater or inorganic salts such as NaCl that constitute an electrolyte. Other methods involve electrode exchange, since electrodes may undergo degradation if the alkalinity still fails to meet a standard despite the above operations. The quantity of electricity during electrolysis and/or the amount of electrolyzed alkaline water that is sprayed are increased in a case where the concentrations of $NO_X$ and $SO_X$ in the gas after exhaust gas purification or the amount of bacteria in the electrolyzed alkaline water exceed a standard.

In the exhaust gas purifying apparatus of the present embodiment, the scrubber wastewater is the water to be electrolyzed, such that the electrolyzed alkaline water obtained through electrolysis of the scrubber wastewater is used in the purification treatment of exhaust gas. However, it is possible to use seawater alone as the water to be electrolyzed. Further, water other than seawater and having electrolytes such as NaCl, KCl or $Na_2SO_4$ added thereto may be used as the water to be electrolyzed.

Figure 5:
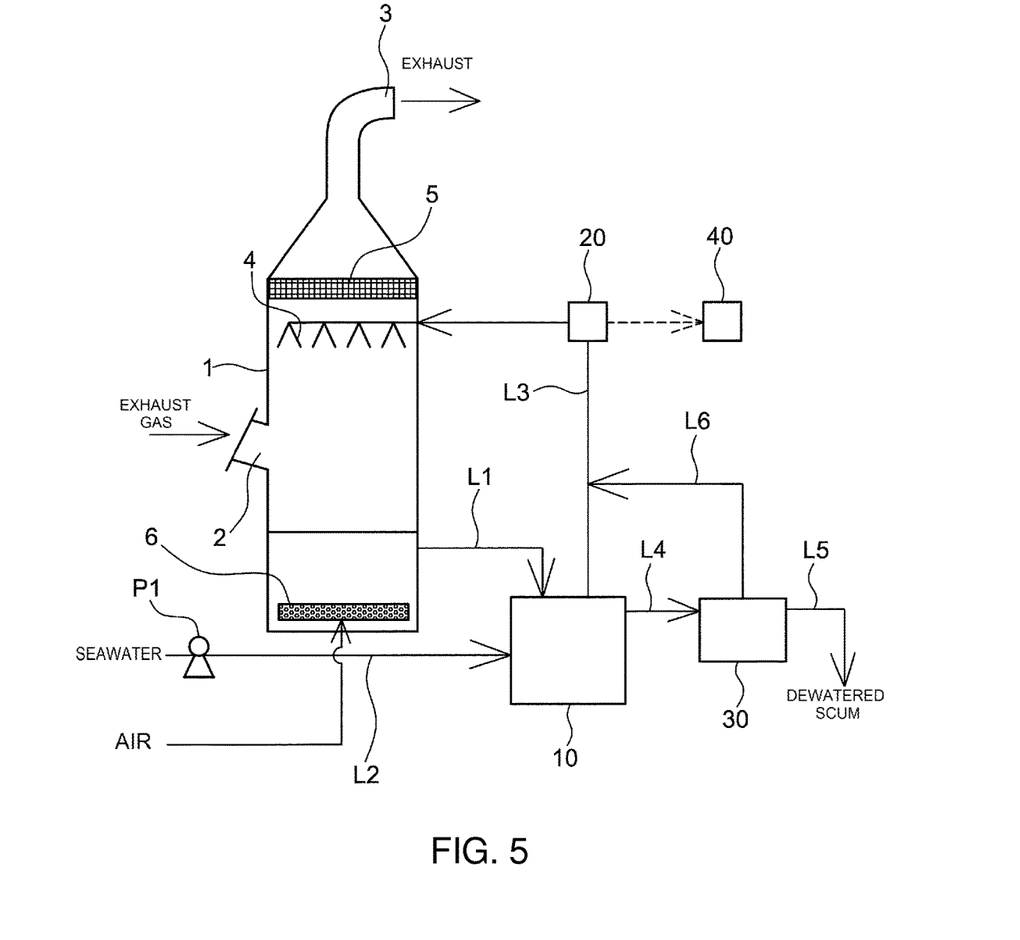
FIG. 5 is a schematic diagram of an exhaust gas purifying apparatus in a second embodiment of the present invention.

FIG. 5 illustrates another embodiment of the exhaust gas purifying apparatus of the present invention.

This exhaust gas purifying apparatus has the same basic configuration as that of the above-described embodiment, but differs from the above embodiment in that now an air diffuser device 6 is provided at the scrubber wastewater storage section 70 of scrubber wastewater, at the bottom of the exhaust gas absorption tower 1.

The oxygen concentration in the exhaust gas may drop, and $NO_X$, $SO_X$ and the like may fail to be sufficiently oxidized, in cases of incomplete combustion of a fossil fuel, or if low-quality fuel oil or the like is used as a fuel. In the present exhaust gas purifying apparatus, air can be blown, by the air diffuser device 6, into the scrubber wastewater that is stored at the bottom of the exhaust gas absorption tower 1, and hence $NO_X$, $SO_X$ and the like captured in the electrolyzed alkaline water can be sufficiently oxidized.

WORKING EXAMPLES

Test Example 1

Figure 6:
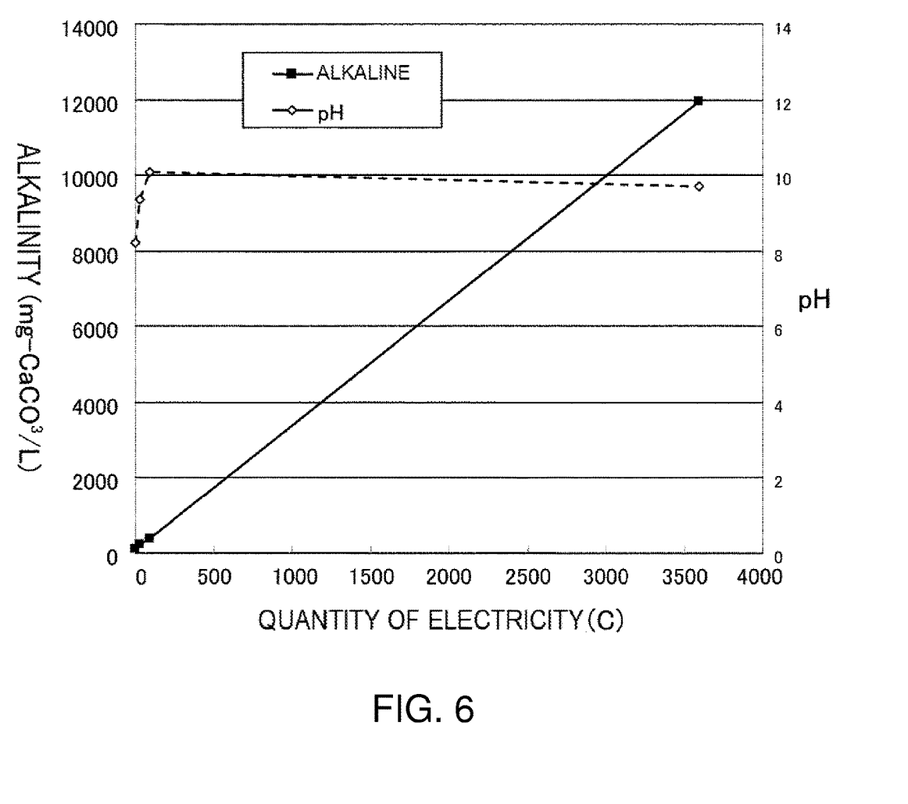
FIG. 6 is a diagram illustrating a relationship between quantity of electricity during electrolysis and pH and alkalinity of obtained electrolyzed alkaline water, in Test example 1.

An electrolysis tank (diameter 67 mm×height 90 mm) made of PVC was charged with 200 ml of seawater. An anode (pure magnesium metal, diameter 9.5 mm×100 mm) and a cathode (pure magnesium metal, diameter 9.5 mm×100 mm) were immersed in the seawater in the electrolysis tank, and the electrodes were fixed so as to be 30 mm apart from each other. The anode, the cathode and a DC stabilized power source were connected by electric wires, and voltage was applied between the anode and cathode, with the anode at positive voltage, to electrolyze the seawater thereby. FIG. 6 illustrates the relationship between the quantity of electricity in electrolysis and pH and alkalinity of the obtained electrolyzed alkaline water. Alkalinity was measured herein in accordance with the method in section 15.1 of JIS K 0102.

As illustrated in FIG. 6, the alkalinity of electrolyzed alkaline water increased proportionally to the increase in the quantity of electricity during electrolysis. Meanwhile, the pH became substantially constant, at about pH 10, once the quantity of electricity was 100 C or higher.

Test Example 2

An electrolysis tank (diameter 67 mm×height 90 mm) made of stainless steel was charged with 200 ml of seawater. An anode (pure magnesium metal, diameter 9.5 mm×100 mm) was immersed in the seawater in the electrolysis tank, and the anode was fixed in such a manner that the spacing between the anode and the electrolysis tank was 20 mm or more. The anode, the electrolysis tank and a DC stabilized power source were connected by electric wires, and voltage was applied between the anode and electrolysis tank, with the anode at positive voltage, to electrolyze the seawater thereby. The alkalinity of the electrolyzed alkaline water increased with increasing quantity of electricity (current× time) during electrolysis. Meanwhile, the pH became substantially constant, at about pH 10, once the amount of flowing electricity was 100 C or higher.

Test Example 3

An anode (pure magnesium metal, diameter 15 mm×300 mm) was fixed, using an insulating spacer (polyacetal resin), coaxially with the center of a cylindrical tube (made of stainless steel, 80 A×length 300 mm). The anode, the cathode and a DC stabilized power source were connected with electric wires. Then seawater was caused to pass through the interior of the cylindrical tube, at a flow rate of about 0.1 L/s, and voltage was applied between the anode and the cylindrical tube, with the anode at positive voltage, to thereby electrolyze the seawater flowing through the cylindrical tube. The alkalinity of the electrolyzed alkaline water increased with increasing quantity of electricity (current×time) during electrolysis. Meanwhile, the pH was substantially constant, at about pH 10, also with electrolysis performed under a condition of quantity of electricity of 100 C or greater.

Figure 7:
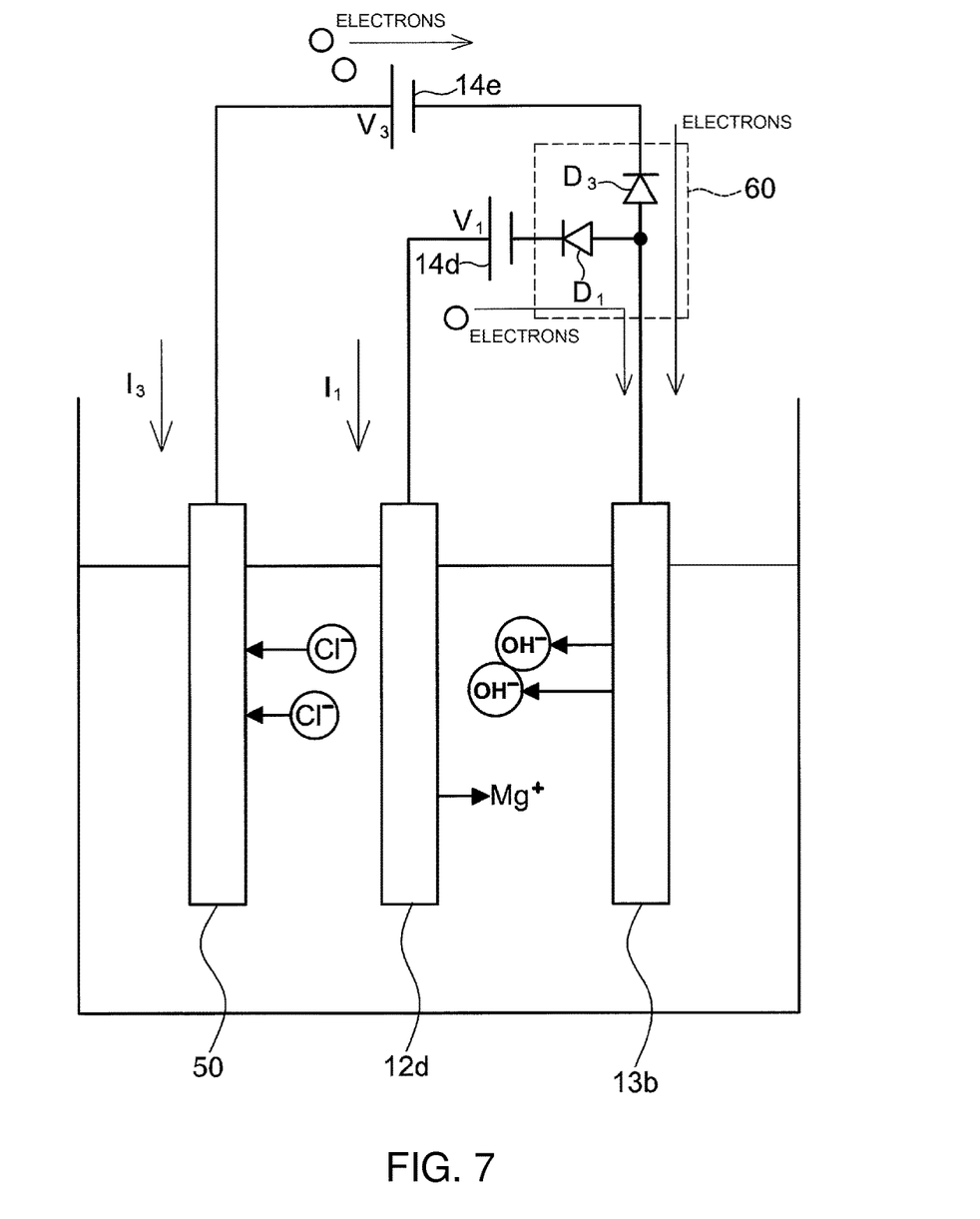
FIG. 7 is a schematic diagram of an embodiment of an electrolyzed alkaline water generator of an exhaust gas purifying apparatus of a third embodiment of the present invention.
Figure 8:
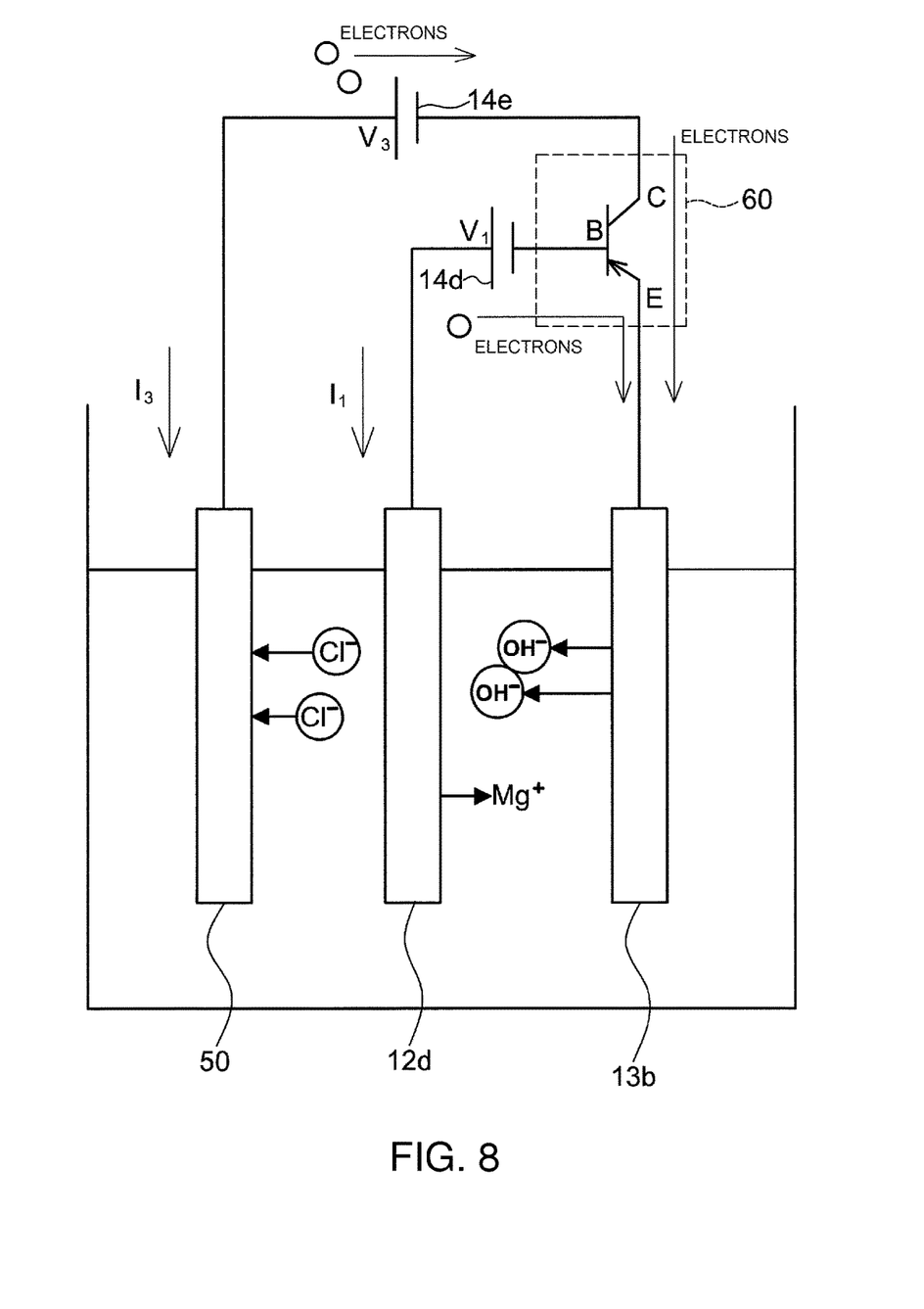
FIG. 8 is a schematic diagram of another embodiment of an electrolyzed alkaline water generator.

FIG. 7 and FIG. 8 illustrate another embodiment of the exhaust gas purifying apparatus of the present invention.

This exhaust gas purifying apparatus has the same basic configuration as that of the above-described embodiment, but is different in that now an auxiliary anode 50, made up of a water-insoluble and conductive material, is provided inside the electrolysis tank 11c. The exhaust gas purifying apparatus of the present embodiment differs also in that the auxiliary anode 50 is connected to the cathode 13b and the anode 12d (which may be a main anode) via a coupling circuit 60, and voltage is applied to the auxiliary anode 50 by a power source 14d. A diode is used, in FIG. 7, as the coupling circuit 60, and a transistor is used in FIG. 8.

An electrolyzed alkaline water generator 10d illustrated in FIG. 7 includes an electrolysis tank 11c into which water to be electrolyzed is introduced, an anode 12d formed of Mg or a Mg alloy, and a cathode 13b that opposes the anode 12d. Voltage is applied, by the power source 14d (which may be a first voltage applicator), across the electrodes. The auxiliary anode 50 is connected to the cathode 13b and the anode 12d via the coupling circuit 60, and a power source 14e (which may be a second voltage applicator) applies voltage to the auxiliary anode 50. Water to be electrolyzed that is introduced into the electrolysis tank 11c is electrolyzed as a result.

In the present embodiment electrons are supplied from the auxiliary anode 50 to the cathode 13b, via the power source 14e, in addition to the electrons supplied from the anode 12d to the cathode 13b via the power source 14d. The OH ions generated in the cathode 13b are proportional to the amount of supplied electrons, and hence in the case of operation at a constant amount of current, the amount of electrons supplied from the anode 12d can be reduced in proportion to the increment in electrons that are supplied from the auxiliary anode 50.

Herein, Mg must undergo ionization and elution in order for electrons to be generated in the anode 12d. In the present embodiment, the amount of electrons supplied in the anode 12d can be reduced; accordingly, the elution amount of Mg can be likewise reduced.

In the present embodiment, the elution amount in the anode 12d can be reduced although the amount of OH ions generated in the cathode 13b does not change overall. In a case where the auxiliary anode 50 is not used, unlike in the present embodiment, the electrodes must be exchanged periodically, due to elution of Mg of the anode. Accordingly, elution of Mg in the anode is faster, the electrode exchange frequency higher, and electrode costs greater, if the amount of wastewater is large, or in case of high acid concentration.

In the present embodiment, however, the amount of elution of Mg in the anode 12d can be reduced, and hence the frequency of electrode exchange can be reduced, which translates into lower costs.

Moreover, the auxiliary anode 50 needs not be exchanged in principle, since an insoluble material is used therein.

Test Example 4

Water to be electrolyzed (aqueous solution (3%) of NaCl 400 ml), an anode 12d (magnesium metal ϕ9.5 mm×length 100 mm), a cathode 13b (activated carbon width 100 mm×length 100 mm×thickness 2 mm), an auxiliary anode 50 (carbon width 50 mm×length 100 mm×thickness 2 mm), power sources 14d and 14e (DC stabilized power sources 0 to 40 V, 0 to 18 A) and a coupling circuit (Schottky barrier diode) were used herein.

As illustrated in FIG. 7, the anode 12d, the cathode 13b and the auxiliary anode 50 were inserted in the water to be electrolyzed and were wired. Diodes were used in the coupling circuit 60; herein, the cathode of a diode $D_1$ was connected to the anode 12d, and the cathode of a diode $D_3$ was connected to the auxiliary anode 50. When the forward voltage drop of the diode is large, the resistance towards current $I_1$ between the anode 12d and the cathode 13b increases; accordingly, there may be selected a germanium diode or Schottky barrier diode having a forward voltage drop as small as possible.

Voltage was applied by a DC stabilized power source, such that the current $I_1$ between the anode 12d and the cathode 13b was 50 mA, and current $I_3$ between the auxiliary anode 50 and the cathode 13b was 150 mA. Herein, $Mg(OH)_2$ was generated as a result of an electrode reaction, and the alkalinity of the water to be electrolyzed increased by 5.0 mg/L (in terms of $CaCO_3$) after three minutes.

In a case where, by contrast, only the current $I_2$ of 50 mA flowed between the anode 12d and the cathode 13b, the alkalinity of the water to be electrolyzed increased by 1.6 mg/L (in terms of $CaCO_3$) after three minutes.

These results are summarized in Table 1. In method A, the auxiliary anode 50 is not used, and the electrolyzed alkaline water generator uses only an anode and a cathode. The Mg elution amounts of the anode are identical in method A and the present embodiment, but alkalinity is larger in the present embodiment. That is, the Mg elution amount for obtaining water of desired alkalinity is smaller in the present embodiment. High-alkalinity water generated in the present embodiment can be used for neutralizing acidic water, as is the case in the method A.

TABLE 1

| | Mg elution amount (mg) | Alkalinity increment (mg/L, $CaCO_3$ basis) |
|---|---|---|
| Present embodiment | 1.13 | 5.0 |
| Method A | 1.13 | 1.6 |

Conditions: 50 mA current to anode for 3 min, in 400 ml of 3% aqueous solution of NaCl Test Example 5

Water to be electrolyzed (aqueous solution (3%) of NaCl 400 ml), an anode 12d (magnesium metal ϕ9.5 mm×length 100 mm), a cathode 13b (activated carbon width 100 mm×length 100 mm×thickness 2 mm), an auxiliary anode 50 (carbon width 50 mm×length 100 mm×thickness 2 mm), power sources 14d and 14e (DC stabilized power sources 0 to 40 V, 0 to 18 A) and a coupling circuit (pnp-type transistor) were used herein.

As illustrated in FIG. 8, the anode 12d, the cathode 13b and the auxiliary anode 50 were inserted in the water to be electrolyzed and were wired. A transistor was used in the coupling circuit 60, such that the base of the transistor was connected to the anode 12d, the emitter was connected to the cathode 13b and the collector was connected to the auxiliary anode 50. Voltage was applied by the DC stabilized power source, with base current $I_1$=50 mA and collector current $I_3$=150 mA. The Mg elution amount could be reduced, with the resulting increase in alkalinity being substantially identical to that in a case where a diode was used.

Remarks on Test examples 4 and 5 are explained next.

These test examples are carried out batch-wise, but a continuous scheme (test performed with flowing water) may be resorted to, with identical results.

Figure 9:
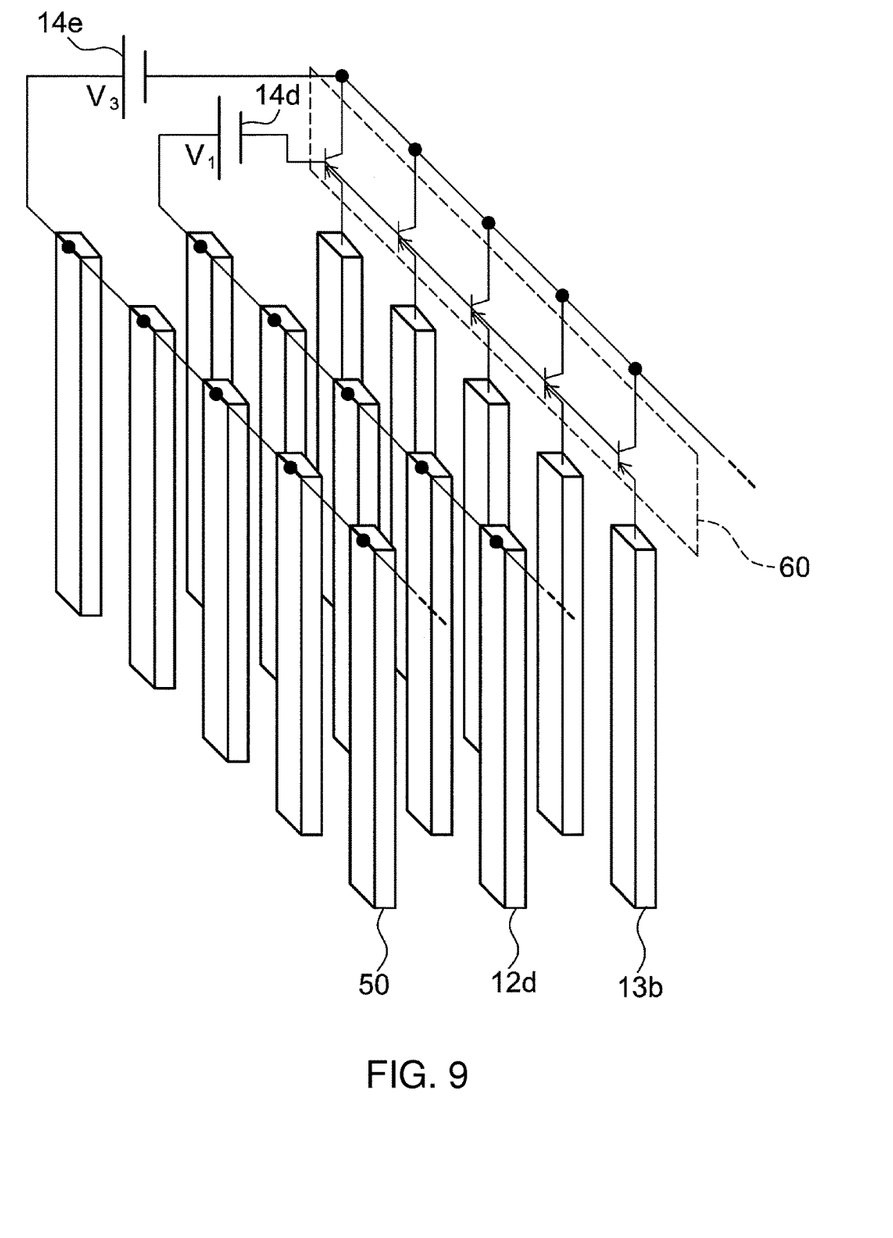
FIG. 9 is a schematic diagram of another embodiment of an electrolyzed alkaline water generator.

In the present test examples, high-alkalinity water is generated using a comparatively small device, but the same effects can be achieved with a scaled-up device. Element selection and circuit construction in the coupling circuit 60 must be such that the latter can withstand large currents, in accordance with the magnitude of electrolysis. In a scaled-up device a plurality of anodes 12d and cathodes 13b is connected with shared power sources, as in FIG. 9, and in the auxiliary anode 50, coupled elements (which correspond to 60) are disposed for each electrode, so that current per element is dispersed as a result. For instance, a plurality of transistors may be provided, which correspond to pairs of the cathodes and the anodes.

In the present test examples, high-purity magnesium is used in the electrodes, but other materials may be used, to identical effect, for instance a magnesium-containing alloy such as a Mg—Al—Zn-based alloy, or a material the surface of which has a magnesium-containing layer deposited thereon, for instance by vapor deposition.

The invention claimed is:

1. An exhaust gas purifying apparatus for installation in a vessel, comprising:
    a seawater introduction pipe configured to introduce, via a pump interposed therein, unprocessed seawater;
    an electrolyzed alkaline water generator which is connected to the seawater introduction pipe and includes a cathode and an anode, the electrolyzed alkaline water generator being configured to electrolyze the unprocessed seawater introduced therein by the seawater introduction pipe through application of a voltage across the cathode and the anode so as to generate electrolyzed alkaline water from the unprocessed seawater;
    an exhaust gas absorption tower, exhaust gas being introduced into, and exhausted from, the exhaust gas absorption tower;
    an electrolyzed alkaline water supply line through which the electrolyzed alkaline water is supplied from the electrolyzed alkaline water generator to the exhaust gas absorption tower; and
    a spray nozzle connected with the electrolyzed alkaline water supply line to receive the electrolyzed alkaline water and being provided inside the exhaust gas absorption tower, the exhaust gas purifying apparatus being configured to spray the electrolyzed alkaline water through the spray nozzle to purify the exhaust gas through gas-liquid contact between the sprayed electrolyzed alkaline water and the exhaust gas introduced into the exhaust gas absorption tower.

2. The exhaust gas purifying apparatus according to claim 1, wherein the exhaust gas absorption tower includes a scrubber wastewater storage section that recovers the electrolyzed alkaline water sprayed from the spray nozzle, and
    wherein the exhaust gas purifying apparatus further comprises a scrubber wastewater return line through which scrubber wastewater from the scrubber wastewater storage section is communicated to the electrolyzed alkaline water generator.

3. The exhaust gas purifying apparatus according to claim 2, further comprising an air diffuser device provided in the scrubber wastewater storage section.

4. The exhaust gas purifying apparatus according to claim 1, further comprising:
    a water quality analyzer that analyzes alkalinity of the electrolyzed alkaline water generated by the electrolyzed alkaline water generator; and
    an alkalinity adjustment device that adjusts the alkalinity of the electrolyzed alkaline water in such a manner that the alkalinity becomes equal to or higher than a predetermined value.

5. The exhaust gas purifying apparatus according to claim 1, wherein the electrolyzed alkaline water generator includes an electrolysis tank made up of a water-insoluble and conductive material, and the anode is disposed inside the electrolysis tank,
    the exhaust gas purifying apparatus being configured to apply a positive voltage to the anode and apply a negative voltage to the electrolysis tank, to thereby electrolyze the water inside the electrolysis tank.

6. The exhaust gas purifying apparatus according to claim 5, wherein the electrolysis tank is the cathode.

7. The exhaust gas purifying apparatus according to claim 1, wherein the electrolyzed alkaline water generator includes a duct which is made up of a water-insoluble and conductive material and through which water, which is to be electrolyzed, flows,
the anode is disposed inside the duct, and
the exhaust gas purifying apparatus being configured to apply a positive voltage to the anode and apply a negative voltage to the duct, to thereby electrolyze the water to be electrolyzed that flows through the duct to generate the electrolyzed alkaline water.

8. The exhaust gas purifying apparatus according to claim 7, wherein the duct is a pipe.

9. The exhaust gas purifying apparatus according to claim 7, wherein the duct operates as the cathode.

10. An exhaust gas purifying apparatus, comprising:
an exhaust gas absorption tower, including
an exhaust gas inlet through which exhaust gas is introduced into the exhaust gas absorption tower, and
a spray nozzle provided inside the exhaust gas absorption tower, and being configured to spray electrolyzed alkaline water to purify the exhaust gas through gas-liquid contact between the sprayed electrolyzed alkaline water and the exhaust gas introduced into the exhaust gas absorption tower;
an electrolyzed alkaline water generator, including
an anode and a cathode, across which a voltage is applied to electrolyze water in the electrolyzed alkaline water generator, to thereby generate the electrolyzed alkaline water and a scum,
a first inlet through which scrubber wastewater from the exhaust gas absorption tower is communicated to the electrolyzed alkaline water generator,
a second inlet through which unprocessed seawater is supplied to the electrolyzed alkaline water generator,
a first outlet through which the generated electrolyzed alkaline water is outputted, and
a second outlet through which the generated scum is discharged, the electrolyzed alkaline water generator being configured to electrolyze the unprocessed seawater introduced therein by the second inlet through application of the voltage across the cathode and the anode so as to generate the electrolyzed alkaline water from the unprocessed seawater;
an electrolyzed alkaline water supply line connecting the first outlet of the electrolyzed alkaline water generator to the spray nozzle, and communicating the electrolyzed alkaline water generated in the electrolyzed alkaline water generator to the spray nozzle, wherein
the anode is formed of one selected from the group consisting of Mg and an Mg alloy, and
Mg of the anode elutes during electrolysis to form $Mg(OH)_2$ in the electrolyzed alkaline water, so that the scrubber wastewater reacts with at least one of Mg ions and OH ions to form the scum.

11. The exhaust gas purifying apparatus according to claim 10, further comprising a dewatering device that performs solid-liquid separation on the discharged scum to obtain a dewatered scum.

12. The exhaust gas purifying apparatus according to claim 1, wherein the anode of the electrolyzed alkaline water generator is formed of Mg or an Mg alloy.

* * * * *